United States Patent [19]

Jensen et al.

[11] Patent Number: 5,395,079
[45] Date of Patent: Mar. 7, 1995

[54] PIPE ANCHOR

[75] Inventors: Finn Jensen, Dolton; Rudolph E. Nadherny, Naperville, both of Ill.

[73] Assignee: Ireco, Inc., Chicago, Ill.

[21] Appl. No.: 132,110

[22] Filed: Oct. 5, 1993

[51] Int. Cl.6 .................................................. F16L 3/00
[52] U.S. Cl. ...................................... 248/62; 248/74.1; 248/903
[58] Field of Search ................... 248/56, 57, 58, 62, 248/74.1, 67.5, 903

[56] References Cited

U.S. PATENT DOCUMENTS

| | | | |
|---|---|---|---|
| 1,108,328 | 8/1914 | Burnett | 248/56 |
| 1,313,113 | 8/1919 | Pleister | 248/903 X |
| 1,573,893 | 2/1926 | Zifferer | 248/62 |
| 1,986,861 | 1/1935 | Starr | 248/62 |
| 2,474,172 | 6/1949 | Tinnerman | 248/56 |
| 2,546,792 | 3/1951 | Smith et al. | |
| 2,625,354 | 1/1953 | Smith | 248/74.4 X |
| 3,128,073 | 4/1964 | Berlyn | 248/74.1 X |
| 4,222,538 | 9/1980 | Jensen et al. | |

Primary Examiner—Ramon O. Ramirez
Assistant Examiner—Korie H. Chan
Attorney, Agent, or Firm—Lockwood, Alex, FitzGibbon & Cummings

[57] ABSTRACT

Two-part pipe anchor clamps and systems for securing lengths of pipe to rigid structural supports, particularly, for anchoring air lines and other train pipes to structural members in railway car frames. Each two-part pipe anchor clamp comprising a base clamp member with means whereby it may be fixedly attached, as by welding, to a structural support member and a drivable wedge clamp member to be driven into wedged mating relationship with the base clamp member. The base clamp has a saddle-shaped pipe-engaging portion with integrally formed flanges projection laterally along opposite sides. The drivable wedge clamp member has a cradle-shaped pipe-engaging portion with integrally formed ears projecting laterally along opposite sides and matable in wedging relationship with the flanges to clamp a pipe therebetween. The drivable clamp member has a driving tab on one end and a reinforcing centered rib on its cradle portion which provides a gap in the area of engagement of the cradle portion and the clamped pipe. The area of engagement between the interior of the saddle portion of the base clamp and a pipe is divided into two parts arcuately occupying generally the 10 to 11 o'clock and 1 to 2 o'clock positions. The area of engagement between the interior of the cradle portion of the wedge clamp member and the pipe are divided by the gap so as to occupy generally the 4 to 5 o'clock and 7 to 8 o'clock positions. The bend between each said portion of a base clamp member and a laterally extending flange includes a set of outwardly protruding gussets which also serve to guide in assembling the two-part clamps.

16 Claims, 1 Drawing Sheet

U.S. Patent                    Mar. 7, 1995                    5,395,079
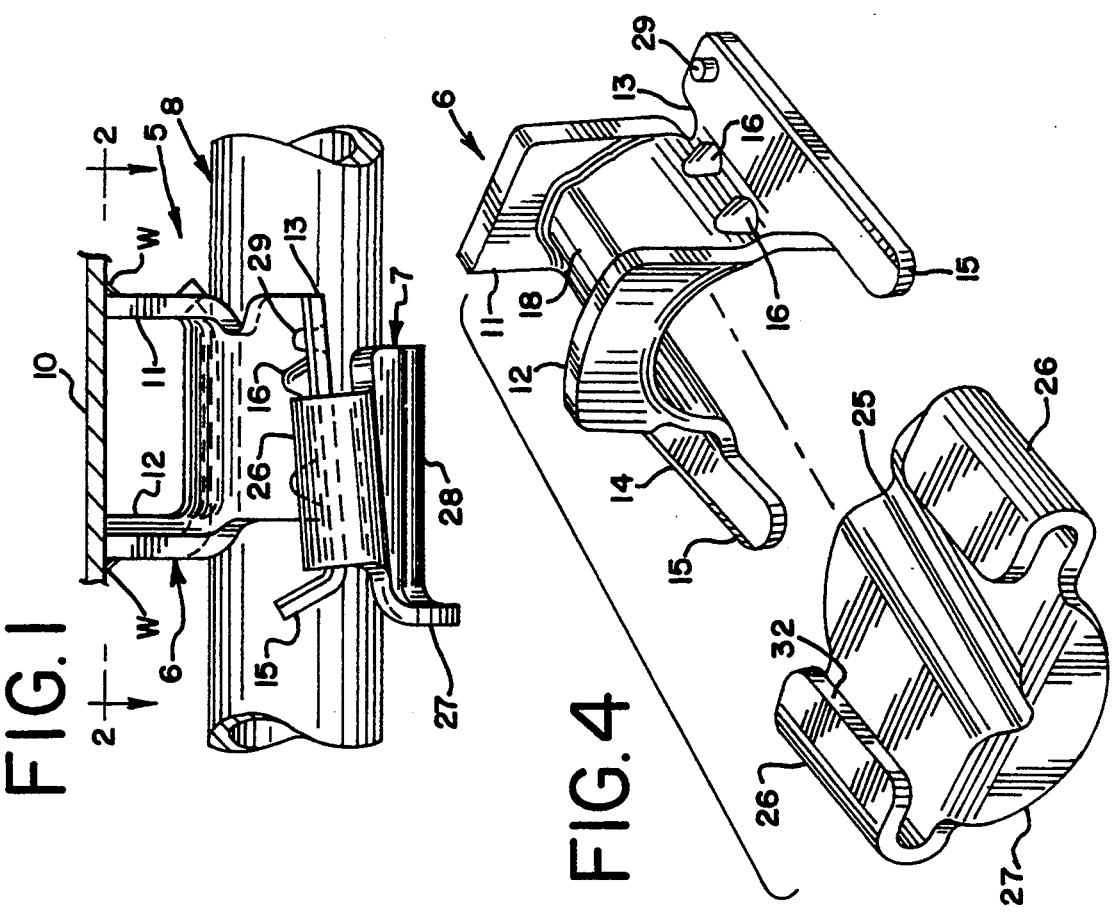
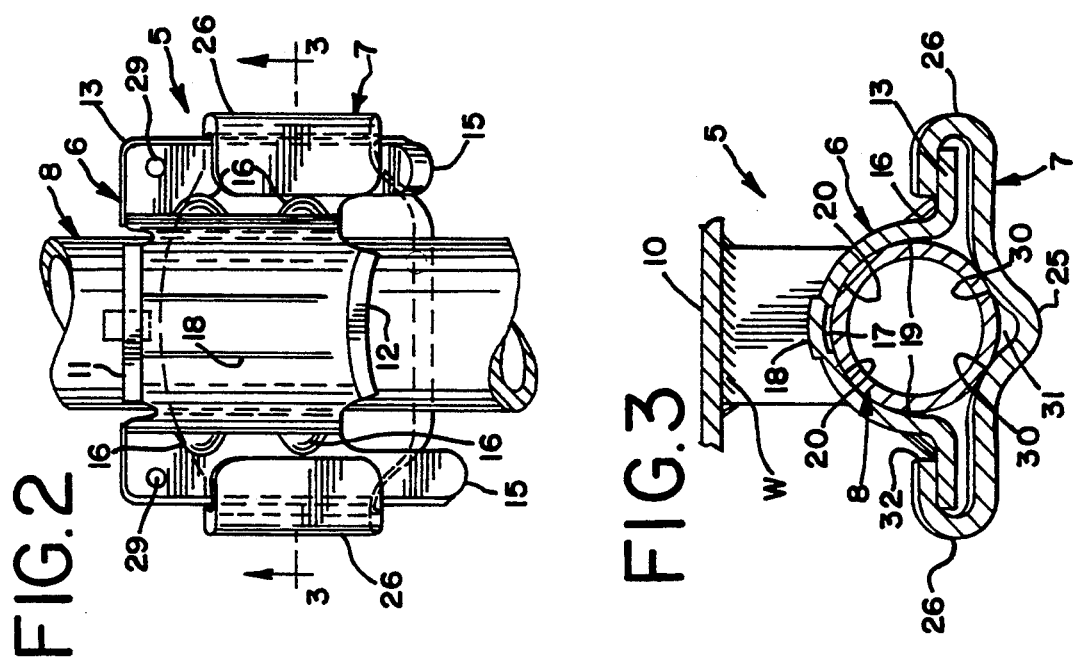

PIPE ANCHOR

BACKGROUND AND DESCRIPTION OF THE INVENTION

This invention relates, generally, to improvements in pipe anchors of the type used for anchoring pipes or conduits to structural members, particularly structural members in the underframes of railway cars. Such pipe anchors are known and disclosed in U.S. Pat. No. 2,546,792 dated Mar. 27, 1951 and U.S. Pat. No. 4,222,538 dated Sep. 16, 1980. The pipe anchors disclosed in these prior art patents, as well as the pipe anchor of the present invention, include two parts, one part is sometimes referred to as a base clamp member while the other part is sometimes referred to as a wedge clamp member. A base clamp member is normally attached by welding or other suitable means to a rigid structural member and has a saddle portion which engages one side of a pipe. A wedge clamp member mates with the base member utilizing the inclined plane principle to provide a wedging action so as to firmly clamp a length of pipe therebetween. The wedge member has a cradle portion which engages the pipe on the side thereof opposite to the side engaged by the saddle portion of the base member. Pipe anchors of this general type are disposed along a length of pipe at suitable intervals. Once the wedged clamp members have been driven into their full clamping and assembled relationship with their respective base members, tab means are bent or deformed so as to lock the two parts together.

According to the present invention, pipe anchors of the foregoing general type are provided which incorporate improvements which serve to enhance the functioning and strength of these devices without significant, if any, increase in the cost thereof. One problem sometimes encounterable with two-part pipe anchors of the prior art was the bending of the driving tabs on the wedge clamping members, tending to make removal and reuse of the wedge members difficult or impossible.

Another problem sometimes encountered with prior art pipe anchors was lack of sufficient guidance as a wedge member was first hand-assembled and then driven into full clamping and assembled relationship with a base anchor. Still another problem sometimes associated with prior art two-part pipe anchors in the form of stampings was weakness of the bends where the lateral flanges integrally extending from opposite sides of the saddle portion joined the saddle portion. And still another shortcoming of two-part pipe anchors of the prior art was the failure to utilize to a maximum the pipe gripping and clamping forces between the pipe anchors and a pipe.

The object of the present invention, generally stated, is the provision of two-part pipe anchors of the foregoing general type which either eliminate or minimize the foregoing shortcomings and which are economical to manufacture and readily installed.

For a more complete understanding of the nature and scope of the invention, reference may now be had to the following detailed description of a presently preferred embodiment thereof taken in connection with the accompanying drawings, wherein:

FIG. 1 is a side elevational view showing a two-part pipe anchor forming an embodiment of the present invention installed so as to anchor a pipe to a rigid structural support, such as in a railway car underframe;

FIG. 2 is a top plan view of the pipe anchor installation shown in FIG. 1 taken on line 2—2 of FIG. 1;

FIG. 3 is a vertical sectional view taken on line 3—3 of FIG. 2; and,

FIG. 4 is an exploded view showing the two parts of the pipe anchor shown in FIGS. 1–3.

Referring to drawings, a two-part pipe anchor is indicated generally at 5 comprising a base clamp member 6 and a mating drivable wedge clamp member 7. In FIGS. 1–3, the pipe anchor 5 is shown installed in pipe clamping and anchoring relationship on a length of pipe 8. For purposes of illustration the base clamp member 6 is shown welded to a structural support member 10 as by welding indicated at W—W.

The base clamp member 6 may be in the form of a stamping, forging or casting and is generally saddle shaped so as to fit on the pipe 8. The base 6 has an upwardly extending rear attaching flange 11 and an upwardly extending arcuate front attaching flange 12. The arcuate shape imparts additional strength to the member 6. Along the opposite bottom edges of the saddle portion of the base clamp member 6 it has a pair of longitudinally extending, upwardly inclined flanges 13 and 14. The forward ends of the flanges 13 and 14 are extended so as to provide upwardly bendable locking tabs 15. The right hand tab 15 is shown in its upwardly bent locking condition in FIGS. 1 and 2.

In order to strengthen the bend or juncture between each of the flanges 13 and 14 and the main saddle portion of the base member 6, pairs of gussets or indentations 16—16 are provided at the bends during the formation of the member 6. These gussets 16 also serve as guides when the guidable clamp member 7 is assembled and driven into place.

The saddle portion of the base clamp member 6 is shaped so that the interior surface thereof interfits with the upper surface of the pipe 8 in a particular manner. Specifically, the interior surface at the top of the saddle is relieved or removed as indicated at 17 (FIG. 3) so as to be spaced from and not engage the top exterior of the pipe 8 in a longitudinal area equal to the arcuate width of the space 17. Preferably, the base member 6 includes a longitudinal rib 18 at the top corresponding to the width of the space or relief 17. The shape of the interior surface of the base clamp member 6 is such that it has engagement with the exterior of the pipe in two rectangular arcuate areas 20—20 lying on opposite sides of the space 17. Downwardly from the arcuate engaging surfaces 20 the shape of the saddle portion of the member 6 is such that its interior does not engage the opposite sides of the pipe 8 but, instead, has clearance with respect thereto as indicated at 19—19 (FIG. 3). Accordingly, the engagement between the interior surface of the base member 6 and the exterior of the pipe 8 is confined to the longitudinally extending arcuate areas 20—20. The clearances 19 facilitate the installation of a series of the pipe anchors 5 at intervals along a pipe.

The drivable clamp member 7 is likewise formed by stamping, forging or casting so that it can be driven into wedging clamping relationship with the base clamp member 6 and thereby clamp the pipe 8 therebetween and in turn, secure its attachment to the support member 10. The drivable clamp member 7 has a cradle shaped longitudinal central portion 25 with integrally formed ears 26—26 laterally extending from opposite sides thereof. The ears 26 are formed by flanges which are doubled over so as to form channel formations which matingly fit over the flanges 13 and 14 of the base clamp member 6. The ears 26 are upwardly inclined from the front to the rear at an inclination matching the inclination of the flanges 13 and 14.

Across its front end the wedge clamp member 7 has a downwardly turned integrally formed driving tab 27. After the clamp member 7 has been hand-assembled to the base clamp member 6, the tab 27 is used to drive the clamp member 7 into wedged clamping relationship with the base clamp member 6.

The drivable clamp member 7 may be stamped or otherwise formed so as to include the cradle portion 25 in the form of a longitudinal reinforcing rib which extends integrally from the driving tab 27 for the length of the member 7. This reinforcing rib and cradle portion 25 serves both to strengthen the driving tab 27 so as to prevent it from becoming deformed or bent and to reinforce the clamp member 7 and divide it into two longitudinal pipe engaging arcuate areas or surfaces 30—30 with a longitudinal arcuate gap 31 therebetween. The width of the arcuate areas 30 is approximately equal to the width of the arcuate areas 20.

After the drivable clamp member 7 has been hand-assembled and then driven by a hammer or mallet into its full mating and clamping relationship with the base clamp member 6, at least one of the locking tabs 15 on the flanges 13 and 14 is bent upwardly as shown in FIGS. 1 and 2 so as to lock the two parts of the pipe anchor 5 together with the pipe 8 firmly clamped therebetween.

Relating the width of the arcuate areas 20—20 and 30—30 to the dial of a clock, the areas 20 generally occupy the 10-11 and 1-2 o'clock positions while the areas 30 occupy the 7-8 and 4-5 o'clock positions. By confining and concentrating the areas of engagement with the pipe 8 to these arcuate areas, maximum advantage is taken of the retention force due to the coefficient friction so as to maintain the two parts of the pipe anchor 5 in assembled relationship without becoming loosened over periods of extended use in which the pipe anchors are generally subjected to prolonged vibration.

From FIGS. 2 and 3, it will be seen that the two pairs of reinforcing gussets 16—16 provide guidance for the inturned edges 32—32 of the ears 26 during assembly. This guiding relationship facilitates the initial hand-assembly of the two parts of the pipe anchor 5 and also the additional relative movement between these parts when the member 7 is driven "home".

In order to prevent accidental over-driving of a drivable clamp member 7 on a base clamp member 6, wedge stops 29—29 are provided on the rear ends of the flanges 13 and 14.

The several manners in which the pipe anchors 5 may be installed are known from the large numbers of two-part prior art pipe anchor clamps that have been installed.

What is claimed:

1. A two-part pipe anchor clamp for securing a length of pipe to a rigid structural support, comprising, a base clamp member with means to be fixedly attached to said support and a drivable wedge clamp member to be driven into wedged mating relationship with said base clamp member so as to clamp said pipe therebetween, said base clamp member, comprising, a pipe engaging saddle portion for fitting against one side of said length of pipe in an elongated longitudinal area of engagement, and integrally formed wedge clamp member retention flange formations projecting laterally along opposite sides of said saddle portion, said drivable wedge clamp member comprising, a pipe engaging cradle portion for fitting with an elongated longitudinal area of engagement against the side of said length of pipe opposite said saddle portion, integrally formed ear formations projecting laterally along opposite sides of said cradle portion and matable in wedged pipe clamping relationship with said base clamp member flange formations, and a clamp driving tab on one end whereby said drivable wedge clamp member may be driven into wedged pipe clamping mating engagement with said base clamp member, and said cradle portion of said drivable clamp member having an integrally formed channel-shaped reinforcing rib extending longitudinally therealong for reinforcing both said cradle portion and said clamp driving tab and for providing a longitudinal gap in said elongated longitudinal area of engagement between said cradle portion and said length of pipe.

2. The two-part pipe anchor of claim 1 wherein the area of engagement of the interior of said saddle portion of said base clamp member with a pipe is divided into two parts with a longitudinally extending area of non-engagement therebetween.

3. The two-part pipe anchor clamp of claim 2 wherein the area of engagement of the interior of said cradle portion is divided into two parts separated by said gap.

4. The two-part pipe anchor clamp of claim 3 wherein said areas of engagement of said saddle portion with a length of pipe extend generally between the 1 to 2 o'clock and 10 to 11 o'clock positions and said areas of engagement of said cradle portion extend generally between the 4 to 5 o'clock and 7 to 8 o'clock positions.

5. The two-part pipe anchor clamp of claim 1 wherein each juncture where at one of said wedge clamp member retention flanges joins said saddle portion is reinforced by a set of outwardly protruding integrally formed gussets and wherein each said set provides guidance for the distal edge of each of said ear formations during assembly of the two parts of the pipe anchor clamp.

6. The two-part pipe anchor of claim 5 wherein the area of engagement of the interior of said saddle portion of said base clamp member with a pipe is divided into two parts with a longitudinally extending area of non-engagement therebetween.

7. The two-part pipe anchor clamp of claim 6 wherein the area of engagement of the interior of said cradle portion is divided into two parts separated by said gap.

8. The two-part pipe anchor clamp of claim 7 wherein a length of areas of engagement saddle portion with said pipe extend generally between the 1 to 2 o'clock and 10 to 11 o'clock positions and said areas of engagement of said cradle portion extend generally between the 4 to 5 o'clock and 7 to 8 o'clock positions.

9. Pipe anchor system for securing a length of pipe at intervals therealong to rigid structural support means, comprising, a plurality of base clamp members to be fixedly attached to said support means and mounted at intervals on said length of pipe, and a corresponding plurality of drivable wedge clamp members to be driven into wedged mating relationship with said base members so as to clamp said length of pipe therebetween, each said base clamp member, comprising, a pipe engaging saddle portion for fitting against one side of said length of pipe in an elongated area of engagement, and integrally formed wedge clamp member retention flange formations projecting laterally along opposite sides of said saddle portion, each said drivable wedge clamp member comprising, a pipe engaging cradle portion for fitting with an elongated longitudinal area of engagement against the side of said length of pipe opposite said saddle portion, integrally formed ear formations projecting laterally along opposite sides of said cradle portion and matable in wedged pipe clamping relationship with said base clamp flange formations, and a clamp driving tab extending across one end whereby said drivable wedge clamp member may be driven into wedged pipe clamping mating engagement with said base member, and said cradle portion of said clamp member having an integrally formed channel-shaped reinforcing rib extending longitudinally therealong from end to end thereof for reinforcing both said cradle portion and said clamp driving tab and for providing a longitudinal gap in said elongated longitudinal area of engagement between said cradle portion and said length of pipe.

10. The pipe anchor system of claim 9 wherein the area of engagement of the interior of said saddle portion of each said base clamp member with a pipe is divided into two parts with a longitudinally extending area of non-engagement therebetween.

11. The pipe anchor system of claim 10 wherein the area of engagement of the interior of said cradle portion of each said wedge clamp member with a pipe is divided into two parts separated by said gap.

12. The pipe anchor system of claim 11 wherein said areas of engagement of said saddle portions with said pipe extend generally between the 1 to 2 o'clock and 10 to 11 o'clock positions and said areas of engagement of said cradle portions extend generally between the 4 to 5 o'clock and 7 to 8 o'clock positions.

13. The pipe anchor system of claim 9 wherein each juncture where at one of said wedge clamp member retention flanges joins said saddle portion of each said base clamp member is reinforced by a set of outwardly protruding integrally formed gussets and wherein each said set provides guidance for the distal edge of one of each of said ear formations of a said wedge clamp member during assembly of the two parts of each pipe anchor clamp.

14. The pipe anchor system of claim 13 wherein the area of engagement of the interior of said cradle portion of each said wedge clamp member with a pipe is divided into two parts separated by said gap.

15. The pipe anchor system of claim 14 wherein the area of engagement of the interior of said cradle portion of each said wedge clamp member with a pipe is divided into two parts separated by said gap.

16. The two-part pipe anchor system of claim 15 wherein said areas of engagement of said saddle portions with a length of pipe extend generally between the 1 to 2 o'clock and 10 to 11 o'clock positions and said areas of engagement of said cradle portions extend generally between the 4 to 5 o'clock and 7 to 8 o'clock positions.

* * * * *